United States Patent
Piascik et al.

(10) Patent No.: US 10,947,139 B2
(45) Date of Patent: Mar. 16, 2021

(54) LIQUID WASTE TREATMENT SYSTEM

(71) Applicant: Research Triangle Institute, Research Triangle Park, NC (US)

(72) Inventors: Jeffrey Robert Piascik, Raleigh, NC (US); Charles David Stokes, Cary, NC (US); Ethan Klem, Durham, NC (US); Brian Rhys Stoner, Chapel Hill, NC (US); Christopher Gregory, Chapel Hill, NC (US); Nicholas G. Baldasaro, Cary, NC (US); Katelyn Lea Sellgren, Cary, NC (US); David E. Rogers, Durham, NC (US); Brian Grant, Raleigh, NC (US); Brian Thomas Hawkins, Durham, NC (US); Enzo Cellini, Chapel Hill, NC (US)

(73) Assignee: Research Triangle Institute, Research Triangle Park (NC)

( * ) Notice: Subject to any disclaimer, the term of this patent is extended or adjusted under 35 U.S.C. 154(b) by 39 days.

(21) Appl. No.: 16/267,420

(22) Filed: Feb. 5, 2019

(65) Prior Publication Data

US 2019/0169054 A1    Jun. 6, 2019

Related U.S. Application Data

(63) Continuation of application No. PCT/US2017/044786, filed on Aug. 1, 2017.
(Continued)

(51) Int. Cl.
*C02F 1/32* (2006.01)
*C02F 3/00* (2006.01)
(Continued)

(52) U.S. Cl.
CPC ........... *C02F 3/005* (2013.01); *C02F 1/32* (2013.01); *C02F 1/4672* (2013.01);
(Continued)

(58) Field of Classification Search
CPC .... C02F 3/00; C02F 1/32; C02F 1/461; C02F 1/467; C02F 1/48; C02F 3/28;
(Continued)

(56) References Cited

U.S. PATENT DOCUMENTS

| 3,899,405 A * | 8/1975 | Iverson | C02F 1/46114 |
| | | | 588/303 |
| 4,024,055 A * | 5/1977 | Blann | C01G 21/20 |
| | | | 210/712 |

(Continued)

FOREIGN PATENT DOCUMENTS

| KR | 10-2002-0071143 A | 9/2002 |
| KR | 10-2015-0105299 A | 9/2015 |
| WO | 2018031280 A1 | 2/2018 |

OTHER PUBLICATIONS

WIPO, International Preliminary Report on Patentability for International Application No. PCT/US17/44694, dated Feb. 12, 2019, 10 pages.
(Continued)

*Primary Examiner* — Cameron J Allen
(74) *Attorney, Agent, or Firm* — NK Patent Law

(57) ABSTRACT

A liquid waste treatment system includes: a baffle tank subsystem for particle settling; a preprocess tank subsystem downstream of the baffle tank subsystem; a process tank subsystem downstream of the preprocess tank subsystem; and a storage tank subsystem downstream of the process tank subsystem for the storage of treated liquid. A Microbial Fuel Cell (MFC) processing module may be included and may be inserted into the preprocess tank subsystem or
(Continued)

implemented in a second process tank downstream of the process tank subsystem. A faster disinfection may occur in the process tank subsystem, and a slower disinfection may occur in the second process tank according to distinct respective kill curves. An electrochemical cell may be operated in a pulse mode in liquid waste in a pulsed mode.

20 Claims, 16 Drawing Sheets

Related U.S. Application Data

(60) Provisional application No. 62/523,075, filed on Jun. 21, 2017, provisional application No. 62/371,383, filed on Aug. 5, 2016.

(51) Int. Cl.
| | | |
|---|---|---|
| *C02F 9/00* | (2006.01) | |
| *C02F 1/461* | (2006.01) | |
| *C02F 1/467* | (2006.01) | |
| *C02F 1/48* | (2006.01) | |
| *C02F 3/28* | (2006.01) | |
| *C02F 1/44* | (2006.01) | |
| *C02F 1/00* | (2006.01) | |
| *C02F 103/00* | (2006.01) | |
| *C02F 1/04* | (2006.01) | |

(52) U.S. Cl.
CPC .......... *C02F 1/46104* (2013.01); *C02F 1/487* (2013.01); *C02F 3/284* (2013.01); *C02F 9/00* (2013.01); *C02F 1/001* (2013.01); *C02F 1/04* (2013.01); *C02F 1/441* (2013.01); *C02F 1/445* (2013.01); *C02F 1/4674* (2013.01); *C02F 2001/007* (2013.01); *C02F 2001/46133* (2013.01); *C02F 2003/008* (2013.01); *C02F 2103/002* (2013.01); *C02F 2103/005* (2013.01); *C02F 2201/4614* (2013.01); *C02F 2201/4617* (2013.01); *C02F 2201/46135* (2013.01); *C02F 2201/46175* (2013.01)

(58) Field of Classification Search
CPC .......... C02F 3/284; C02F 1/4672; C02F 9/00; C02F 1/487; C02F 3/005; C02F 1/46104; C02F 2001/46133; C02F 1/4674; C02F 2201/46175; C02F 2001/007; C02F 1/441; C02F 2003/008; C02F 2103/005; C02F 1/001; C02F 2201/46135; C02F 2103/002; C02F 1/445; C02F 2201/4614; C02F 2201/4617; C02F 1/04
See application file for complete search history.

(56) References Cited

U.S. PATENT DOCUMENTS

| | | | |
|---|---|---|---|
| 5,244,308 | A | 9/1993 | Mims |
| 8,734,751 | B2 * | 5/2014 | Iang ................. B01D 61/58 |
| | | | 203/31 |
| 2007/0051640 | A1 | 3/2007 | Bellamy |
| 2007/0173679 | A1 | 7/2007 | Guyomarc'h |
| 2009/0145344 | A1 | 6/2009 | Dam-Johansen et al. |
| 2009/0223882 | A1 | 9/2009 | Markle et al. |
| 2012/0152835 | A1 | 6/2012 | Cardenas et al. |
| 2013/0299426 | A1 | 11/2013 | McLeod |
| 2014/0309475 | A1 | 10/2014 | Van Naarden et al. |
| 2015/0135785 | A1 | 5/2015 | Wang et al. |
| 2015/0368137 | A1 | 12/2015 | Miller et al. |
| 2017/0029295 | A1 * | 2/2017 | Ritchie ............... B01D 17/06 |

OTHER PUBLICATIONS

ISA/KR; International Search Report and Written Opinion for International Application No. PCT/US17/44694 dated Jan. 29, 2018, 13 pages.

ISA/KR; International Search Report and Written Opinion for International Application No. PCT/US17/44786 dated Nov. 9, 2017, 12 pages.

* cited by examiner

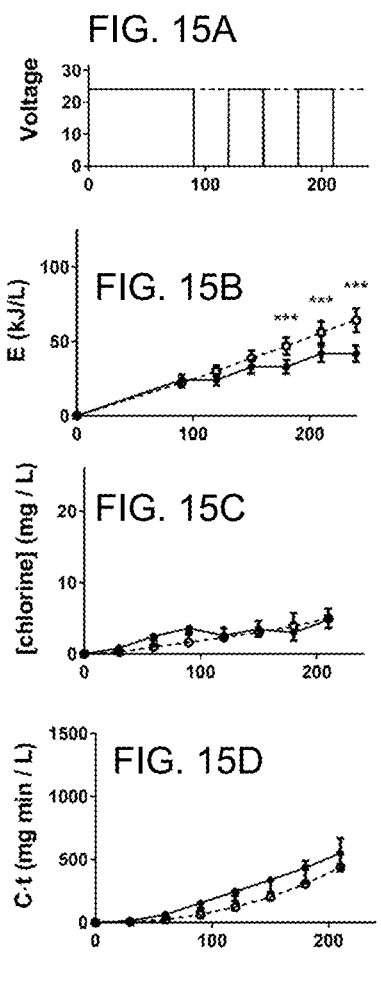
FIG. 15A
FIG. 15B
FIG. 15C
FIG. 15D
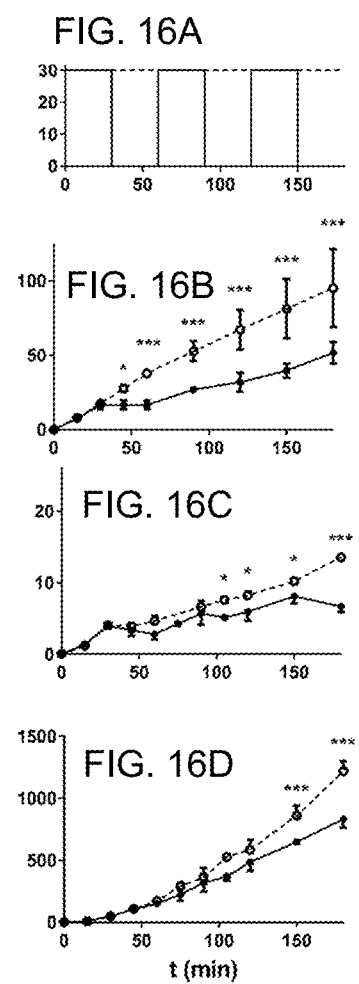
FIG. 16A
FIG. 16B
FIG. 16C
FIG. 16D
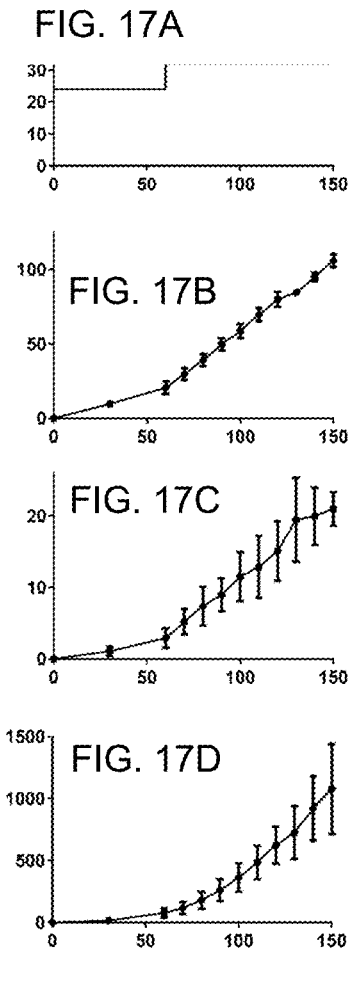
FIG. 17A
FIG. 17B
FIG. 17C
FIG. 17D

LIQUID WASTE TREATMENT SYSTEM

CROSS-REFERENCE TO RELATED APPLICATION

This application is a continuation of PCT patent application no. PCT/US2017/044786 titled "LIQUID WASTE TREATMENT SYSTEM", filed on Aug. 1, 2017, which claims the benefit of priority of U.S. provisional patent application No. 62/371,383 titled "Liquid Waste Treatment System", filed on Aug. 5, 2016, and U.S. Provisional Patent Application No. 62/523,075, titled "Electrochemical Disinfection of Repeatedly Recycled Blackwater in a Free-Standing, Additive-free Toilet", filed Jun. 21, 2017, all of which are incorporated herein in their entirety by this reference.

TECHNICAL FIELD

The present disclosure relates to waste treatment. More particularly, the present disclosure relates to a modular waste treatment system for greywater and blackwater treatment.

BACKGROUND

"Greywater" refers to the wastewater generated in households and workplaces like office buildings. Grey water may include wash water from showers, sinks, dishwashers and other facilities that discharge wastewater other than that of toilets. "Blackwater," on the other hand, refers to the discharge water from toilets and the like, and thus blackwater is expected to contain greater pathogen concentrations than greywater. Greywater can be reused directly for a number of purposes, including the watering of plants, the flushing of toilets, and others. All waters mixed with the discharge of toilets are generally considered blackwater for safety and treatment purposes.

SUMMARY

This summary is provided to introduce in a simplified form concepts that are further described in the following detailed descriptions. This summary is not intended to identify key features or essential features of the claimed subject matter, nor is it to be construed as limiting the scope of the claimed subject matter.

In at least one embodiment, a liquid waste treatment system includes: a baffle tank subsystem for particle settling; a preprocess tank subsystem downstream of the baffle tank subsystem; a process tank subsystem downstream of the preprocess tank subsystem; and a storage tank subsystem downstream of the process tank subsystem for the storage of treated liquid.

In at least one example, the baffle tank subsystem reduces solid load in downstream subsystems.

In at least one example, the baffle tank subsystem is downstream of a solid-liquid separator.

In at least one example, the preprocess tank subsystem has a sloped bottom that allows for fine particle settling.

In at least one example, the process tank subsystem implements at least one of electrochemical treatment, packed bed electrochemical treatment, thermal treatment, and ultraviolet treatment.

In at least one example, conduits connect adjacent subsystems in a downstream flow arrangement from the baffle tank subsystem to the storage tank subsystem.

In at least one example, at least some of the conduits include a respective controlled valve to permit liquid waste under treatment to flow from each upstream subsystem to the adjacent downstream subsystem at a controlled time or upon satisfaction of criteria at each subsystem.

In at least one example, a pass-through disinfection path is parallel to the process tank subsystem from the preprocess tank subsystem to the storage tank subsystem.

In at least one example, the pass-through disinfection path includes at least one of: an electrochemical cell; a filter; a membrane; a heat exchanger; and an ultraviolet radiation device.

In at least one example, a polishing filter subsystem is downstream of the storage tank subsystem.

In at least one example, the polishing filter subsystem further treats liquid to potable standards.

In at least one example, the polishing filter subsystem implements forward or reverse osmosis filtration, or distillation.

In at least one example, the liquid waste treatment system further includes a Microbial Fuel Cell (MFC) processing module.

In at least one example, the MFC processing module reduces the chemical oxygen demand (COD) of a liquid.

In at least one example, the MFC processing module is inserted into the preprocess tank subsystem.

In at least one example, the MFC processing module is implemented in a second process tank downstream of the process tank subsystem.

In at least one example, a first disinfection occurs in the process tank subsystem, and a second disinfection occurs in the second process tank, and wherein the first disinfection is faster than the second disinfection.

In at least one example, the liquid waste treatment system further includes a platform upon which the baffle tank subsystem, the preprocess tank subsystem, the process tank subsystem, and the storage tank subsystem are carried.

In at least one example, stacking of at least one of the preprocess tank subsystem, the process tank subsystem, and the storage tank subsystem above a solid waste handling subsystem reduces a footprint of the liquid waste treatment system.

In at least one example, the liquid waste treatment system further includes an electrochemical cell operated in a pulsed mode. The electrochemical cell may be operated in the pulsed mode after a concentration of a chemical in a process liquid under treatment in the liquid waste treatment system reaches a predetermined threshold. The chemical may be chlorine.

In at least one example, the electrochemical cell is positioned in the process tank subsystem.

In at least one example, a method of liquid waste treatment includes: providing liquid waste to a baffle tank subsystem for particle settling; providing the liquid waste from the baffle tank subsystem to a preprocess tank subsystem downstream of the baffle tank subsystem; providing the liquid waste from the preprocess tank subsystem to a process tank subsystem downstream of the preprocess tank subsystem; and providing the liquid waste from the process tank subsystem to a storage tank subsystem downstream of the process tank subsystem for the storage of treated liquid.

BRIEF DESCRIPTION OF THE DRAWINGS

The previous summary and the following detailed descriptions are to be read in view of the drawings, which illustrate particular exemplary embodiments and features as briefly described below. The summary and detailed descriptions, however, are not limited to only those embodiments and features explicitly illustrated. In the drawings, like reference numbers and numerals indicate like parts throughout the various views, except where indicated otherwise.

FIG. 15A is a plot of an electrochemical cell voltage schedule in which low voltage pulses were applied (on and off) at 30 minute intervals after a selected free chlorine concentration was reached.

FIG. 15B is a plot of energy (kJ) per liter (L) required by the operation cycle FIG. 15 A.

FIG. 15C is a plot of chlorine concentration (mg/L) corresponding to the operation cycle FIG. 15 A.

FIG. 15D is a plot of exposure time (C t) (mg min/L) corresponding to the operation cycle FIG. 15 A.

FIG. 16A is a plot of an electrochemical cell voltage schedule in which high voltage pulses were applied (on and off) at 30 minute intervals after a selected free chlorine concentration was reached.

FIG. 16B is a plot of energy (kJ) per liter (L) required by the operation cycle FIG. 16 A.

FIG. 16C is a plot of chlorine concentration (mg/L) corresponding to the operation cycle FIG. 16 A.

FIG. 16D is a plot of exposure time (C t) (mg min/L) corresponding to the operation cycle FIG. 16 A.

FIG. 17A is a plot of an electrochemical cell voltage schedule in which a low non-pulsed voltage was applied followed by a high non-pulsed voltage.

FIG. 17B is a plot energy (kJ) per liter (L) required by the operation cycle FIG. 17 A.

FIG. 17C is a plot of chlorine concentration (mg/L) corresponding to the operation cycle FIG. 17 A.

FIG. 17D is a plot of exposure time (C t) (mg min/L) corresponding to the operation cycle FIG. 17 A.

DETAILED DESCRIPTIONS

Figure 1:
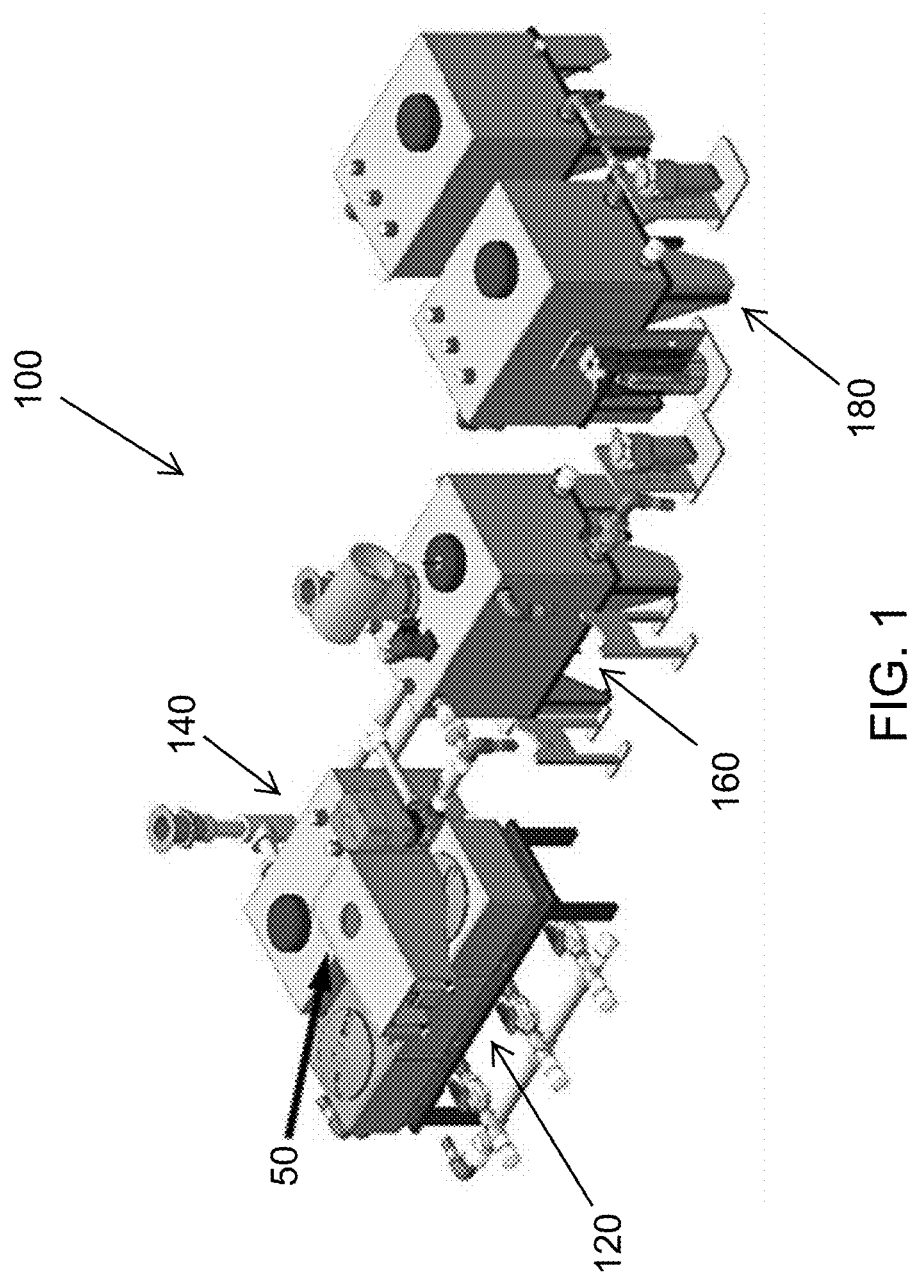
FIG. 1 is a perspective view of a liquid waste treatment system according to at least one embodiment.

These descriptions are presented with sufficient details to provide an understanding of one or more particular embodiments of broader inventive subject matters. These descriptions expound upon and exemplify particular features of those particular embodiments without limiting the inventive subject matters to the explicitly described embodiments and features. Considerations in view of these descriptions will likely give rise to additional and similar embodiments and features without departing from the scope of the inventive subject matters. Although the term "step" may be expressly used or implied relating to features of processes or methods, no implication is made of any particular order or sequence among such expressed or implied steps unless an order or sequence is explicitly stated.

Any dimensions expressed or implied in the drawings and these descriptions are provided for exemplary purposes. Thus, not all embodiments within the scope of the drawings and these descriptions are made according to such exemplary dimensions. The drawings are not made necessarily to scale. Thus, not all embodiments within the scope of the drawings and these descriptions are made according to the apparent scale of the drawings with regard to relative dimensions in the drawings. However, for each drawing, at least one embodiment is made according to the apparent relative scale of the drawing.

In at least one embodiment, a liquid waste treatment system receives greywater and blackwater from sinks, showers and toilets, and produces water that may be discharged or utilized in recycle uses, which include both potable and non-potable uses. An exemplary such waste water treatment system 100 for greywater and blackwater treatment is illustrated in FIG. 1. The liquid waste treatment system 100 can receive greywater or blackwater and output water that is safe to handle and discharge. The liquid waste treatment system 100 is modular, having subsystems that are scalable to needed capacity. The system 100 in FIG. 1 is illustrated as having four subsystems downstream of a solid-liquid separator 50. A particular use for the liquid waste treatment system 100 is in the treatment of toilet facility effluent, and thus the liquid waste entering the system 100 is categorically blackwater in that use. Other uses, for example greywater treatment, are within the scope of these descriptions.

Figure 2:
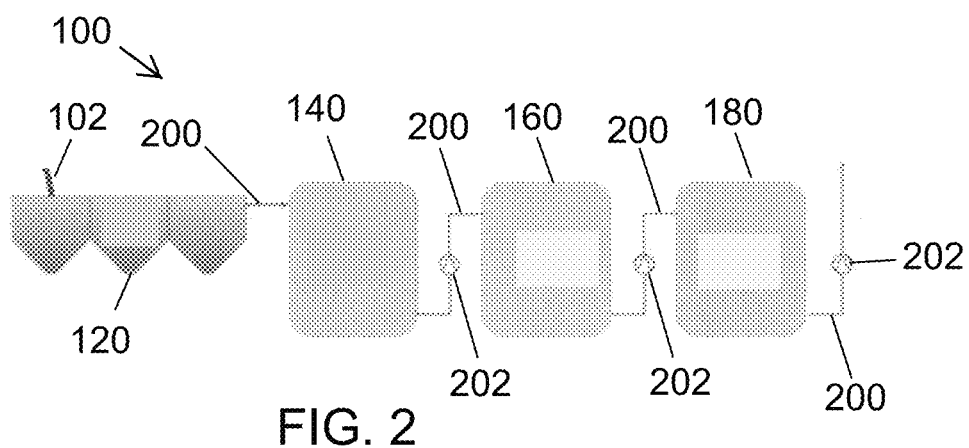
FIG. 2 is diagrammatic representation of the liquid waste treatment system FIG. 1.
Figure 10:
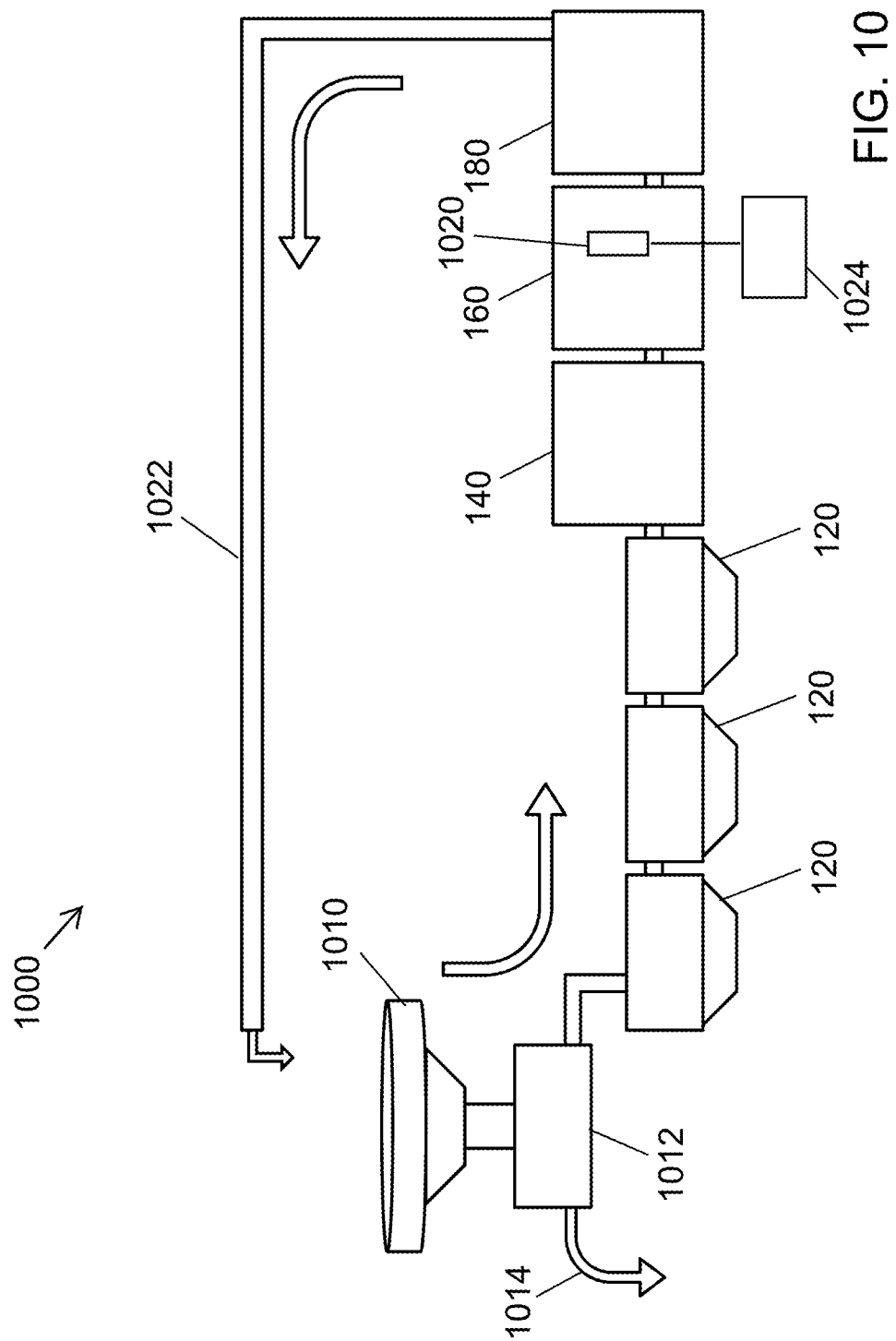
FIG. 10 is a liquid waste disinfection system according to at least one embodiment.

FIG. 2 is diagrammatic representation of the liquid waste treatment system 100, of which FIGS. 1 and 10 represent particular physical implementations among many implementations within the scope of theses descriptions.

The modular liquid waste treatment system 100 (FIGS. 1-2) includes a baffle tank subsystem 120 downstream of the solid-liquid separator 50. The system 100 (FIG. 2), receives effluent input 102 as liquids from the solid-liquid separation. The baffle tank subsystem 120 includes baffles that enhance large particle settling to reduce the overall organic solid load in downstream subsystems.

The modular liquid waste processing system 100 includes a preprocess tank subsystem 140 downstream of the baffle tank subsystem 120. The preprocess tank subsystem 140 has a sloped bottom which allows for fine particle settling.

The modular liquid waste treatment system 100 includes a process tank subsystem 160 downstream of the preprocess tank subsystem 140. The process tank subsystem 160 implements various disinfection treatments or processes according to various embodiments. For example, electrochemical treatment, packed bed electrochemical treatment, thermal treatment, and ultraviolet treatment may be implemented.

The modular liquid waste treatment system 100 includes a storage tank subsystem 180, downstream of the process tank subsystem 160, for the storage of treated liquid.

Conduits 200 (FIG. 2) connect adjacent subsystems 120, 140, 160 and 180 in the downstream flow and process arrangement of the liquid waste treatment system 100 from the baffle tank subsystem 120 to the storage tank subsystem 180. Each conduit 200 may include a controlled valve 202 to permit liquid waste under treatment to flow from each upstream subsystem to the adjacent downstream subsystem at a controlled time or upon satisfaction of criteria at each subsystem.

Figure 3:
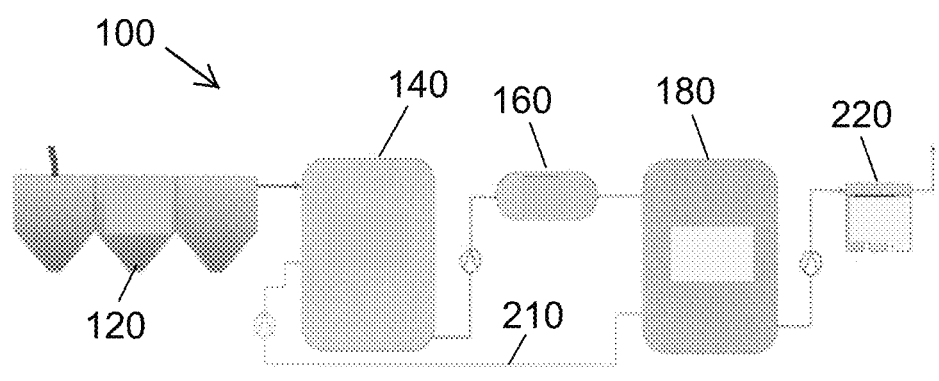
FIG. 3 is diagrammatic representation of another configuration of the liquid waste treatment system of FIG. 1, in which a pass-through disinfection path has been added parallel to the process tank subsystem.

FIG. 3 is diagrammatic representation of another configuration of the liquid waste treatment system 100, in which a pass-through disinfection path 210 has been added parallel to the process tank subsystem 160 from the preprocess tank subsystem 140 to the storage tank subsystem 180. For example, an electrochemical cell, one or more specialized filters or membranes, a custom heat exchanger, and ultraviolet radiation may be implemented in the pass-through disinfection path 210.

Additionally, in FIG. 3, a polishing filter subsystem 220 has been added downstream of the storage tank subsystem 180 to further treat the output liquid to potable standards. For example, the polishing filter subsystem 220 may include custom filters and membranes and/or may heat the output liquid. The polishing filter subsystem 220 may implement forward/reverse osmosis filtration, distillation, and other implementations to further polish the output liquid to desired standards such as potable standards.

FIGS. 4-6 and 9 are diagrammatic representations of other configurations of the liquid waste treatment system 100, in which a Microbial Fuel Cell (MFC) processing module 230 is inserted into the waste stream at various points. These points of insertion can be used independently or in combination with each other. The MFC processing module 230 may be used in the liquid treatment to harvest energy utilizing anaerobic digestion, a process that reduces pathogens.

Figure 4:
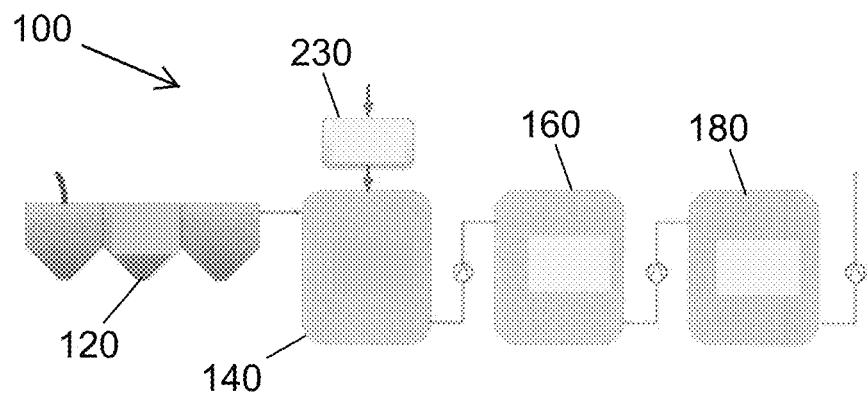
FIG. 4 is a diagrammatic representation of a configuration of the liquid waste treatment system of FIG. 1, in which an MFC processing module is inserted into a liquid waste stream.

In FIG. 4, the MFC processing module 230 is inserted into a urine waste stream that, for example, results from a urinal being present in an integrated toilet system. In this configuration, the processing module 230 reduces the chemical oxygen demand (COD) presented by the urine. This can have a positive impact on system performance by lowering energy required for the electrochemical generation of oxidants used for microbial inactivation. It can also reduce the amount of nitrogen and other chemical compounds, enabling the system to more easily meet discharge and/or reuse standards.

Figure 5:
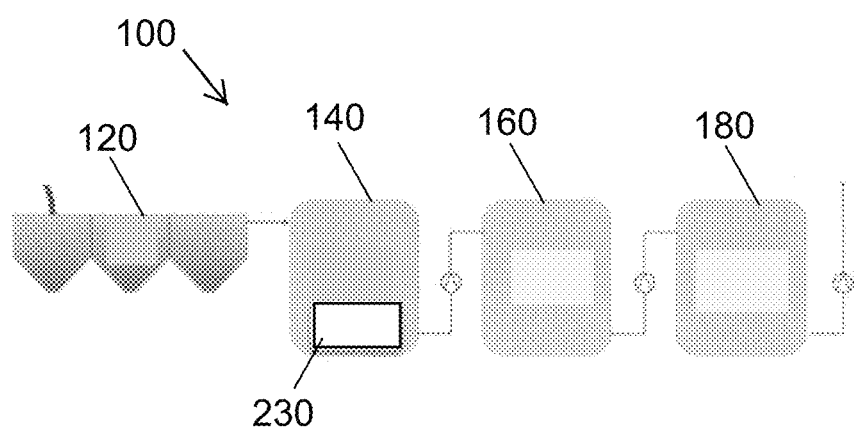
FIG. 5 is a diagrammatic representation of a configuration of the liquid waste treatment system of FIG. 1, in which an MFC processing module is inserted into the preprocess tank subsystem.

In FIG. 5, the MFC processing module 230 is inserted into the preprocess tank subsystem 140, where it treats the concentrated blackwater prior to further treatment in the process tank subsystem 160. This can lower the COD and solids content of the waste prior to, for example, electrochemical treatment, which will reduce energy and time required for processing in the process tank subsystem 160.

Figure 6:
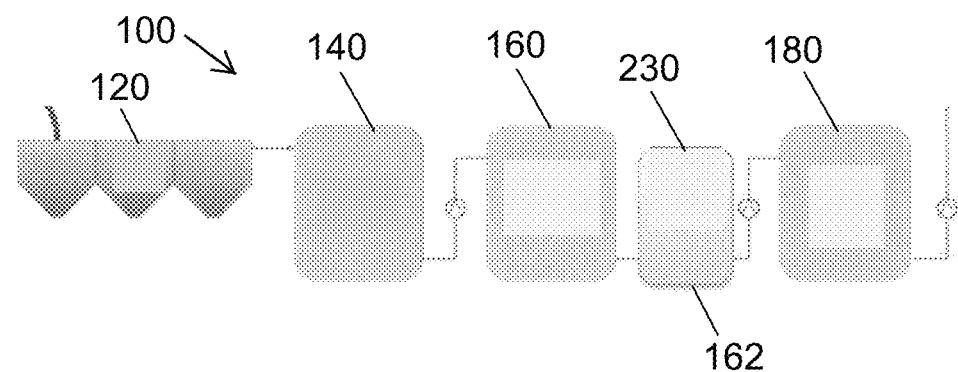
FIG. 6 is a diagrammatic representation of a configuration of the liquid waste treatment system of FIG. 1, in which one or more MFC processing modules are implemented in series with the primary treatment.

In FIG. 6, one or more MFC processing modules 230 are implemented in series with the primary treatment. For example, electrochemical disinfection or other disinfection may be implemented in stages. In the illustrated example, a stage 1 treatment occurs in the process tank subsystem 160 and a stage 2 treatment occurs in a second process tank 162. These two stages are employed to improve the energy efficiency over that seen in a one stage treatment process. The improvement arises from the presence of two distinct kill curves observed during the electrochemical deactivation of bacterial pathogens in concentrated blackwater.

Figures 7A, 7B:
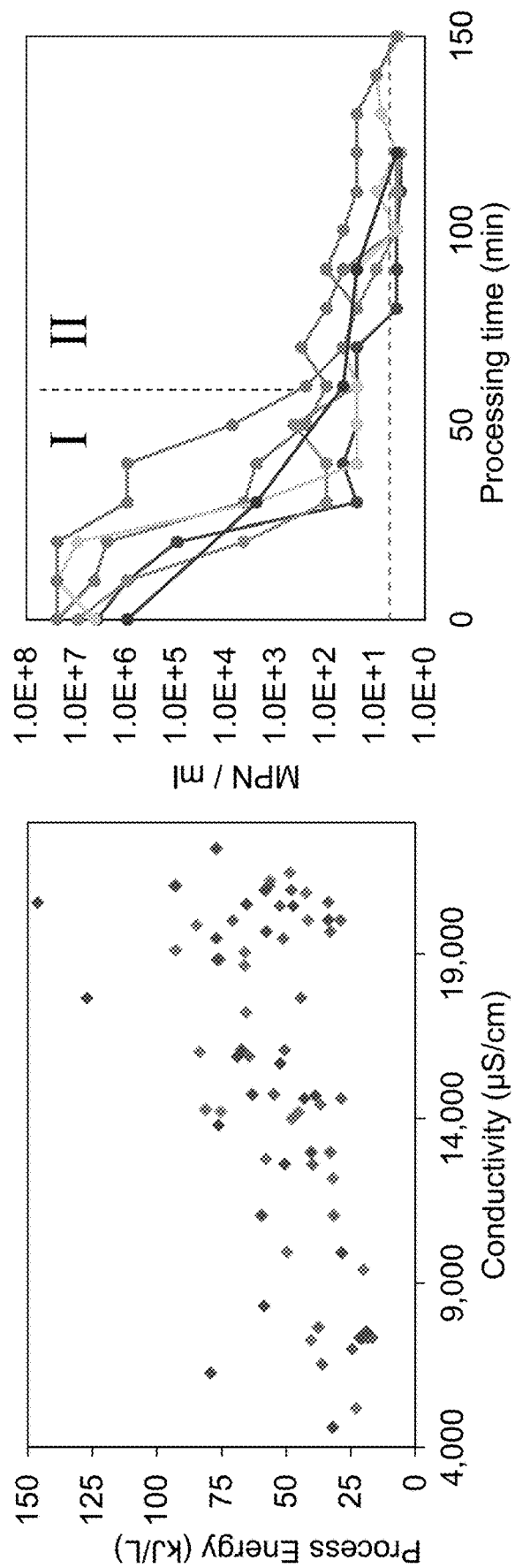
FIG. 7A is a plot of process energy versus conductivity.
FIG. 7B is a plot of MPN/ml versus processing time.

FIGS. 7A and 7B exemplify and demonstrate the energy savings derived from two-stage treatment of the fast and slow kill curves.

FIG. 7A is a plot of process energy versus conductivity. FIG. 7B is a plot of MPN/ml versus processing time. MPN is a statistical method used by FDA to determine most probable number of microbes per unit volume. As shown in FIG. 7B, the first kill curve (I) is a fast-kill component during which over 99% of the pathogens are removed. The second kill curve (I) is a slow-kill component that removes the remaining pathogens from the liquid. The fast kill component requires approximately one third of the total energy required for disinfection and the slow kill consumes approximately two thirds of the total energy. The use of a two-stage process (FIG. 6) allows the fast kill component to be carried out in the process tank subsystem 160, at which point the waste is moved to the second process tank 162, which uses the MFC processing module 230 to treat the pathogens that remain, thus saving the energy associated with using electrochemical treatment of the slow kill component.

Figure 8:
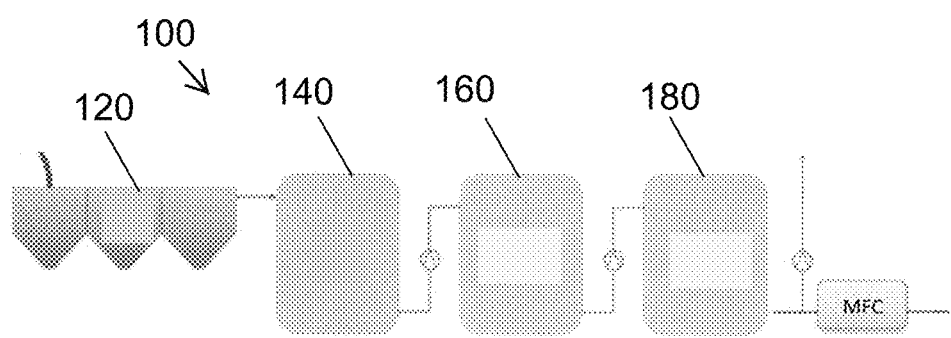
FIG. 8 is a diagrammatic representation of a configuration of the liquid waste treatment system of FIG. 1, in which an MFC processing module is used to further modify the waste liquid characteristics after disinfection.

In FIG. 8, an MFC processing module 230 is used to further modify the liquid characteristics (for example by reducing the COD and solids content) after the liquid has been disinfected, for example in the process tank subsystem 160. The further modification can be conducted to meet additional discharge and/or reuse metrics. This can create additional output streams and post-treatment uses that increase the utility of the liquid waste treatment system 100.

Figure 9:
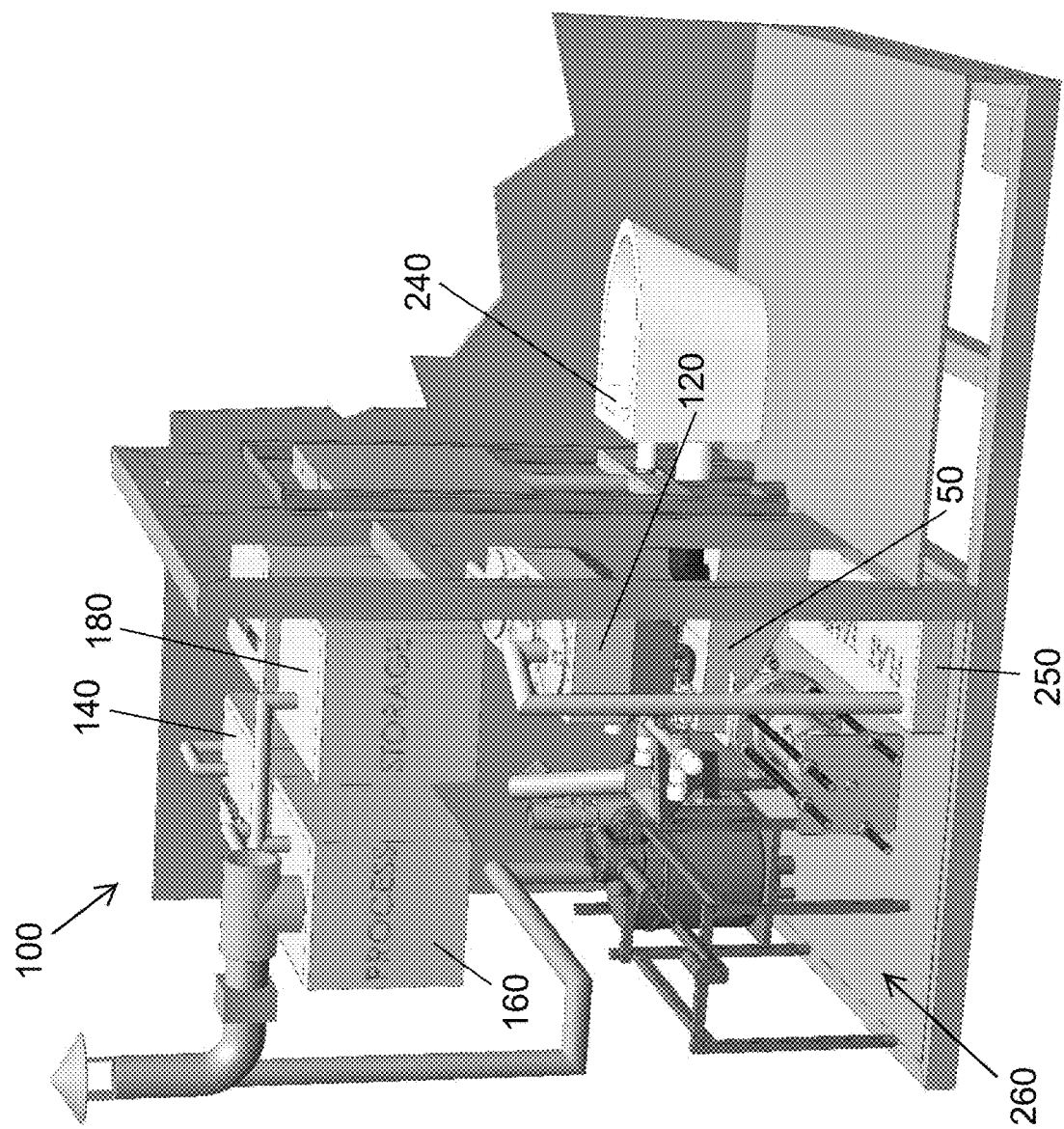
FIG. 9 is a perspective view of a liquid waste treatment system according to at least one embodiment.

FIG. 9 is a perspective view of another physical implementation of the liquid waste treatment system 100 described herein. In FIG. 9, an integrated flush/baffle system 240 precedes the solid-liquid separator 50. The process of the implementation represented in FIG. 9, downstream of the integrated flush/baffle system 240, is diagrammatically represented in FIG. 2, bearing in mind that in FIG. 9, waste liquids are collected from the solid-liquid separator 50 in a lower tank 250 and are subsequently delivered to the baffle tank subsystem 120. The baffle tank subsystem 120 in FIG. 9 includes stainless baffles with integrated heating elements. The stacking of the preprocess tank subsystem 140, the process tank subsystem 160, and the storage tank subsystem

180 above lower solid waste handling subsystems 260 reduces the footprint of the system overall. In this implementation, the liquid waste treatment system 100 is mounted upon a platform skid for stabilization and lifting and placement by a forklift or other equipment.

The liquid waste treatment system 100 can advantageously be quickly deployed and used as a stand-alone system without external sewer system support to reduce the impact of a human presence. Thus, emergency response groups and other entities can use the liquid waste treatment system 100 to serve deployed personnel or to serve victims of natural disasters. Many uses are within the scope of these descriptions.

Decentralized, energy-efficient waste water treatment technologies enabling water reuse are needed to sustainably address sanitation needs in water- and energy-scarce environments. These descriptions regard the effects of repeated recycling of disinfected blackwater (as flush liquid) on the energy required to achieve full disinfection with an electrochemical process in a toilet system according to at least one embodiment. The recycled liquid rapidly reached a steady state with total solids reliably ranging between 0.50-0.65% and conductivity between 20-23 mS/cm through many flush cycles over 15 weeks. The increase in accumulated solids was associated with increased energy demand and wide variation in the free chlorine contact time required to achieve complete disinfection. Further studies on the system at steady state revealed that running at higher voltage modestly improves energy efficiency, and established running parameters that reliably achieve disinfection at fixed run times.

An estimated 2.5 billion people worldwide lack modern electrical and clean water infrastructures, resulting in millions of deaths annually from diseases acquired through the use of unsafe water resources. Distribution of clean water depends upon having the energy available to treat waste water effectively. One approach to quickly address the lack of clean water in lower income countries is to reduce the dependence on energy- and infrastructure-intensive waste water treatment technology.

A free-standing liquid waste disinfection system 1000, for as represented in FIG. 10, described herein for human waste that does not require added water, chemical reagents, or energy in excess of what can be produced at the point of use, is cost-effective, and produces non-potable water suitable for reuse as flush water.

In at least one embodiment, an off-the-shelf mixed metal oxide (MMO) electrochemical cell is effective at disinfecting both model waste water (diluted urine spiked with *E. coli*) and blackwater, consisting of fecal-contaminated urine and recycled flush water, from a toilet. The latter may require longer running times and greater energy inputs per liter to achieve adequate disinfection. Descriptions here expand on those observations, and describe: 1) the accumulation of solids in the system over many flush cycles, wherein blackwater is repeatedly disinfected and recycled; 2) the impact of repeated recycling on the energy requirements for effective disinfection; and 3) modes to improve energy efficiency of the electrochemical process under steady state conditions.

Urine and feces were collected from healthy volunteers 20-50 years of age using a portable urinal and 800-cc graduated specimen collection pans, respectively, and stored at 4° C. until use. Urine was stored for no more than 1 week; fecal samples were typically stored for 0-3 days and never more than 2 weeks.

The liquid waste disinfection system 1000, according to at least one embodiment, is shown in FIG. 10. The toilet 1010 used is a squat plate style toilet (Roca, 1.5 L per flush) connected to a solid-liquid separator 1012. The solid-liquid separator 1012 effects efficient diversion (~60-90%) of fecal solids from liquid from the discharge of the toilet 1010. Separated wet solids 1014 may be further processed or disinfected by an additional subsystem.

Separated liquid is delivered to downstream subsystems, which includes settling tanks 120, a pre-process holding tank 140, a process tank 160, and a post process or storage tank 180 for the flush cistern of the 910. See above further above descriptions of the settling tanks 120, the pre-process holding tank 140, the process tank 160, and post process tank 180, with references to FIGS. 2-4 and 8 for additional descriptions. As in FIG. 2 (see conduits 200), conduits connect adjacent subsystems 120, 140, 160 and 180 in the downstream flow in the liquid waste disinfection system 1000 from the baffle tank subsystem 120 to the storage tank subsystem 180. Each conduit may include a controlled valve to permit liquid waste under treatment to flow from each upstream subsystem to the adjacent downstream subsystem at a controlled time or upon satisfaction of criteria at each subsystem.

Liquid passing through the solid-liquid separator enters a settling system that includes three, 12-L polyethylene containers with 54° sloped bottom, settling tanks 120 connected in series by plastic thermal welding via approximately 1 inch by 4 inch openings cut near the tops of the tanks, yielding effective volumes of approximately 10 L each. The final tank 120 is connected via a gravity feed to a 60-L polyethylene pre-process holding tank 140.

Liquid can be pumped from the pre-process tank 140 through a 10-micrometer filter into another 60-L polyethylene tank (the process tank 160), containing an electrochemical cell 1020. In at least one embodiment, the electrochemical cell 1020 is a mixed-metal-oxide (MMO) electrochemical cell made up of 13 dual-sided electrodes, 64 $cm^2$ in area, separated by a 3-mm gap (Hayward) and a paint stirrer used to agitate the liquid during treatment. Following treatment the liquid is pumped through another 10-micrometer filter to an additional 60-L polyethylene holding tank 180, which serves as the supply reservoir for the flush cistern of the toilet 1010. A return line system 1022, which may include a pump and valves for flow control, conveys treated liquid from the holding tank 180 to the toilet 1010. The electrochemical cell 1020 can be electrically connected to a control system 1024 the powers and cycles the cell 1020. The control system 1024 for example may include a computing device and a power supply.

Flush cycles—Assumptions of toilet use patterns included 2 urinations and 1 defecation (with urination) per person per day, and an approximate 24-hour urine volume of 1.5-2.0 L per person. Two urine flush cycles were performed for each fecal flush cycle. Each urine flush contained 1.5 L of flush liquid (tap water for startup, treated recycled blackwater in subsequent cycles) and 0.5 L of urine. Each fecal flush contained approximately 150-200 g of wet feces, 1.5 L of flush liquid, an additional 0.5 L of flush liquid to simulate the use of an anal wash system, and 0.5 L of urine. Thus, the process liquid requiring treatment contained approximately 23% fresh urine in recycled flush water, contaminated with feces.

Disinfection procedures and energy determination—Waste water was treated in 30-L or 60-L batches. In other examples (data not shown), energy and time requirements for disinfection scaled linearly on a per volume basis up to 60 L (the maximum batch volume the system is designed to treat in at least one embodiment).

Disinfection runs were performed with continuous, vigorous agitation by a paint stirrer in the process tank (450 RPM) with care taken to ensure the electrode surfaces of the electrochemical cell 1020 were completely submerged. Power was applied to the electrochemical cell in constant voltage mode using a DC power supply. Voltage and current were recorded at regular intervals over the course of all runs. Electrochemical energy per volume of process liquid used at time n ($E_n$) was estimated by Equation 1:

$$E_n = \frac{V \int_0^n I(t)dt}{v} \quad \text{(Equation 1)}$$

In Equation 1, V is the voltage, I is the current, and v is the volume being treated. The integral of current with time was estimated by the trapezoid method.

Water chemistry measurements—Oxidative reduction potential (ORP), pH, and conductivity were measured using a Myron L 6PFCE Ultrameter II (Myron L Company, Carlsbad Calif.). The sensor wells were rinsed 3 times with sample prior to measurement.

Free chlorine was measured using the N,N-diethyl-p-phenylenediamine (DPD) method (HACH method 8167) with a HACH DR 900 colorimeter (HACH, Loveland, Colo.) according to the manufacturer's instructions. Blanks consisting of sample effluent without DPD reagent were run prior to each sample to zero the instrument. Free chlorine pillow packs (HACH) were added to 10 mL of sample effluent, allowed to react for 1 min, then run using program 87 Chlorine F&T PP MR. Samples above the range of detection (2.2 mg/L) were diluted with $diH_2O$, and the instrument was zeroed with the diluted sample prior to the addition of reagent. Exposure time (C·t) at time n was calculated by determining the area under the concentration/time curve (Equation 2):

$$C \cdot t_n = (C_{n-1} \cdot t_{n-1}) + \left[\frac{C_n + C_{n+1}}{2}\right] \cdot (t_{n+1} - t_n) \quad \text{(Equation 2)}$$

Total solids (TS) were determined according to the EPA method (EPA, 2001) by evaporating triplicate samples (5-10 ml) at 103-105° C. in tared aluminum weighing dishes. Total suspended solids (TSS) were determined in triplicate by weighing liquid samples (approximately 10 ml) in tared tubes, washing the samples through tared 0.7-micrometer filter paper (Fisher), and weighing the filter papers after drying at 103-105° C.

Microbial enumeration and data analysis—Microbes were enumerated by the most probable number (MPN) method as previously described. Briefly, 5-10-ml samples of process liquid were drawn from the process tank during disinfection runs using sterile pipettes and placed in sterile centrifuge tubes, which were stored at 4° C. until plating. Serial dilutions ($10^{-1}$-$10^{-8}$) of each sample were made in triplicate in lysogeny broth in sterile 48-well cell culture plates. Samples were incubated at 37° C. for 48 hours before being analyzed.

Disinfection energy thresholds for MPN=$10^3$/ml and MPN=5/ml for each disinfection run were interpolated from the plots of log (MPN) versus $E_n$. In the cases where MPN values crossed those thresholds more than once, the threshold was defined as the first point at which the plot crossed that threshold and remained below it for all subsequent measurements. Statistical tests were performed as indicated using GraphPad Prism v. 7.01.

Results—The flush cycles performed for the characterization of steady state running conditions with recycled flush liquid are summarized in Table 1, and were performed on 25 non-consecutive days over a 15-week period. Additional flushes were performed for the purposes of generating material for additional disinfection trials; the flushes presented in Table 1 are representative of all flush cycles performed for examples presented herein.

TABLE 1

| date | $V_{urine}$ (L) | $V_{flush\ liquid}$ L | $V_{total\ liquid}$ (L) | $m_{feces}$ (g) (mean ± S.D., n) | $m_{feces}$ (g)/L |
|---|---|---|---|---|---|
| Oct 13 | 8.5 | 28.0 | 36.5 | 216 ± 57, 5 | 30 |
| Oct 15 | 7.0 | 23.0 | 30.0 | 137 ± 26,4 | 18 |
| Oct 20 | 8.5 | 28.0 | 36.5 | 180 ± 103, 4 | 25 |
| Oct 22 | 8.5 | 28.8 | 36.5 | 182 ± 77, 5 | 25 |
| Oct 26 | 5.5 | 18.0 | 23.5 | 201 ± 80, 3 | 26 |
| Nov 3 | 8.5 | 28.0 | 36.5 | 190 ± 55, 5 | 26 |
| Nov 5 | 7.0 | 23.0 | 30.0 | 153 ± 66, 4 | 20 |
| Nov 9 | 7.0 | 23.0 | 30.0 | 117 ± 25, 4 | 16 |
| Nov 11 | 7.0 | 23.0 | 30.0 | 113 ± 34, 4 | 15 |
| Nov 16 | 7.0 | 23.0 | 30.0 | 145 ± 95, 4 | 19 |
| Nov 17 | 8.5 | 28.0 | 36.5 | 150 ± 73, 5 | 20 |
| Nov 20 | 8.5 | 28.0 | 36.5 | 162 ± 98, 5 | 22 |
| Nov 24 | 7.0 | 23.0 | 30.0 | 126 ± 35, 4 | 16 |
| Nov 30 | 8.5 | 28.0 | 36.5 | 193 ± 66, 5 | 26 |
| Dec 3 | 7 0 | 23.0 | 30.0 | 128 ± 46, 4 | 17 |
| Dec 4 | 7.0 | 23.0 | 30.0 | 118 ± 60, 4 | 16 |
| Dec 8 | 6.5 | 21.5 | 28.0 | 198 ± 105, 4 | 28 |
| Dec 11 | 4.0 | 13.0 | 17.0 | 187 ± 17, 2 | 22 |
| Dec 15 | 7.0 | 23.0 | 30.0 | 162 ± 39, 4 | 22 |
| Jan 8 | 7.0 | 23.0 | 30.0 | 218 ± 33, 4 | 29 |
| Jan 12 | 5.5 | 18.0 | 23.5 | 231 ± 145, 3 | 29 |
| Jan 14 | 7.0 | 23.0 | 30.0 | 203 ± 74, 4 | 27 |
| Jan 19 | 7.0 | 23.0 | 30.0 | 143 ± 95, 4 | 19 |
| Jan 29 | 7.0 | 23.0 | 30.0 | 142 ± 53, 4 | 19 |
| Jan 26 | 7.0 | 23.0 | 30.0 | 142 ± 53, 4 | 21 |

There is considerable individual variation in fecal and urinary output; however, a recent comprehensive review puts the global medians at approximately 128 g of feces (wet weight) and approximately 1.6 L of urine per person per day. With these values and the flush rates used (approximately 3 L recycled blackwater for every L of fresh urine), this comes to approximately 20 g feces/L total liquid in the system; in the present study, our input was 22±5 g/L (Table 1), suggesting that the process liquid in laboratory conditions mimics expected conditions in the field.

Figure 11:
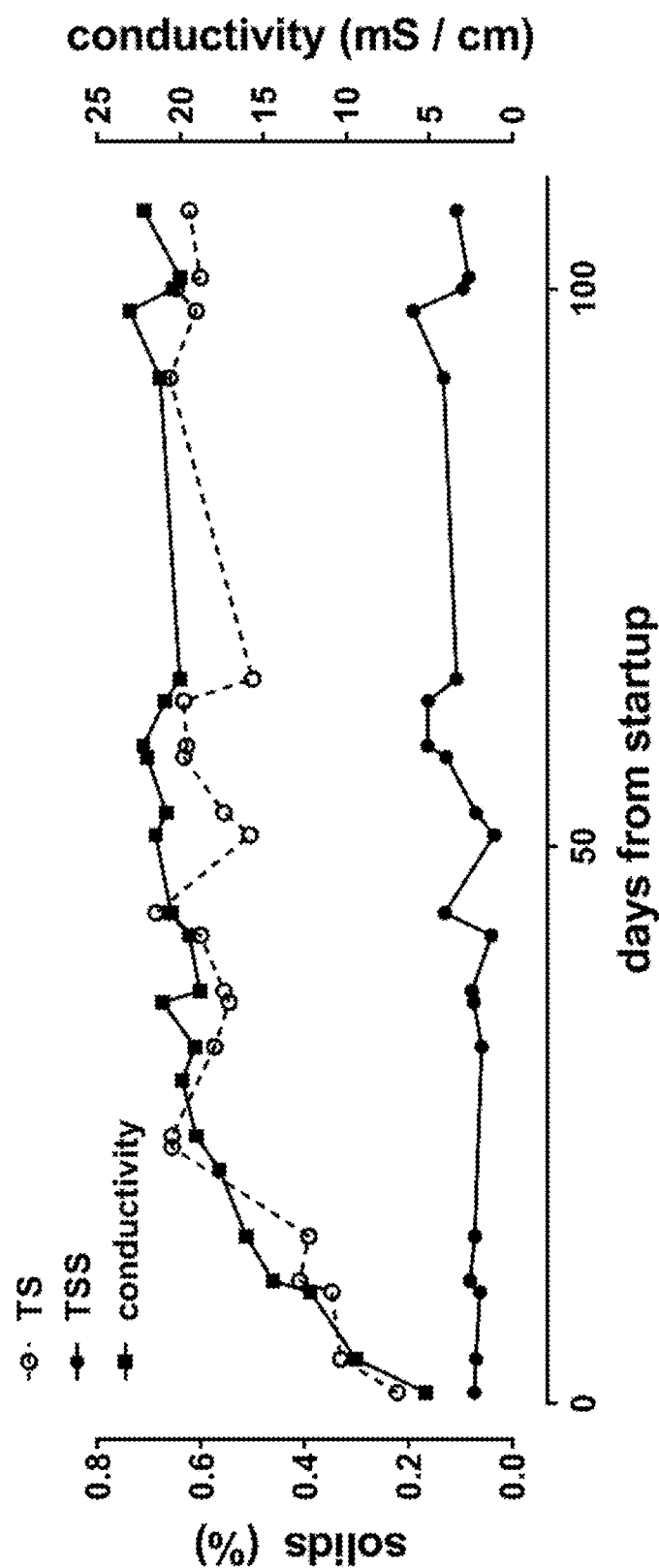
FIG. 11 is a plot of data regarding accumulation of solids.
Figure 19:
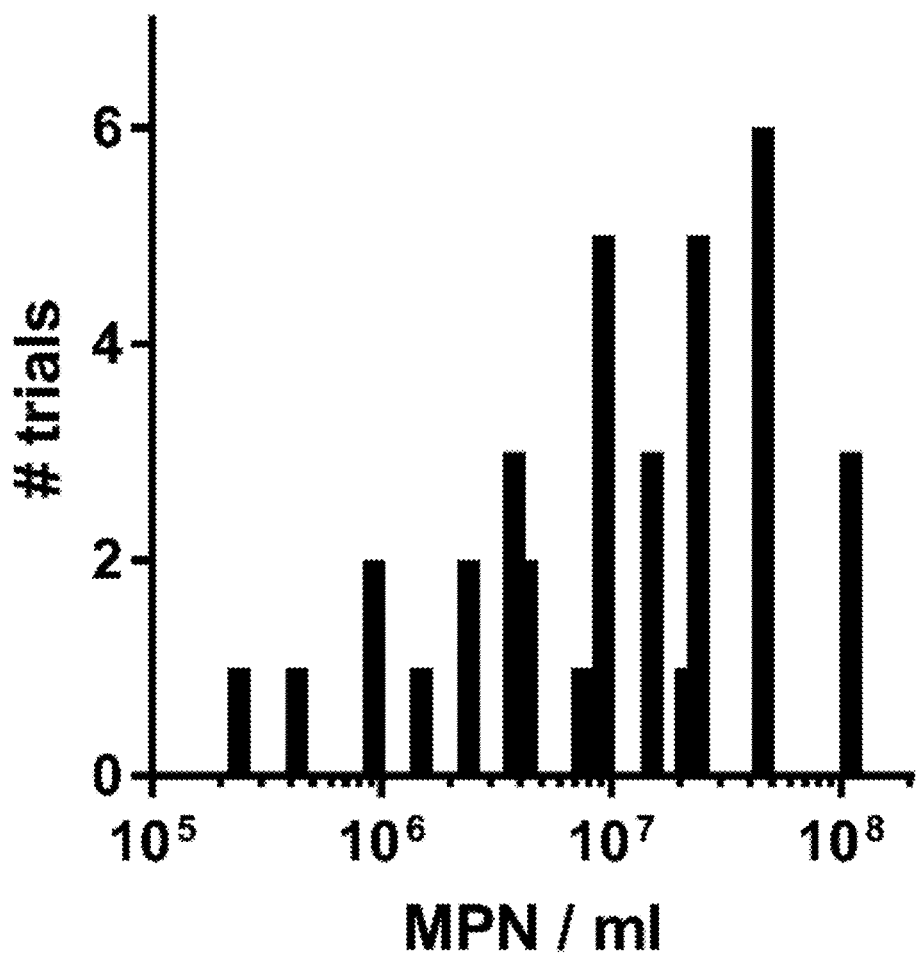
FIG. 19 is frequency distribution of pre-treatment MPN in blackwater process liquid over 36 trials.

Defining steady state in recycled process liquid—Recycling blackwater resulted in a process liquid that was consistently alkaline, with low ORP, high turbidity (Table 2), and microbial counts (MPN) ranging from $10^5$-$10^8$/ml, with most measurements on or near the order of 107/ml (FIG. 19). Conductivity and TS rose rapidly through the first 6-7 flush cycle sets before achieving steady state ranges of approximately 20-23 mS/cm and approximately 0.50-0.65%, respectively, and remained stable over many subsequent cycles (FIG. 11). TSS ranged from 0.034 to 0.191%. The steady state conductivity was higher than that of the collected, pooled urine, which typically ranged from 13-16 mS/cm, suggesting the remainder of dissolved electrolytes found in the process liquid came from feces and/or from the degradation of organic constituents into more conductive species by resident microbiota in the pre-process tanks and/or the electrochemical process.

FIG. 11 is a plot of data regarding accumulation of solids. Samples were taken from the process tank prior to electrochemical treatment. For TS and TSS measurements, numbers shown represent means of triplicate measurements.

TABLE 2

Pre-treatment characteristics of blackwater process liquid

| parameter | mean ± S.D. | range |
|---|---|---|
| pH | 8.76 ± 0.12 | 8.16-8.88 |
| ORP (mV) | −223 ± 121 | −432-+5 |
| turbidity (NTU) | 760 ± 195 | 282-1000 |

Figure 12:
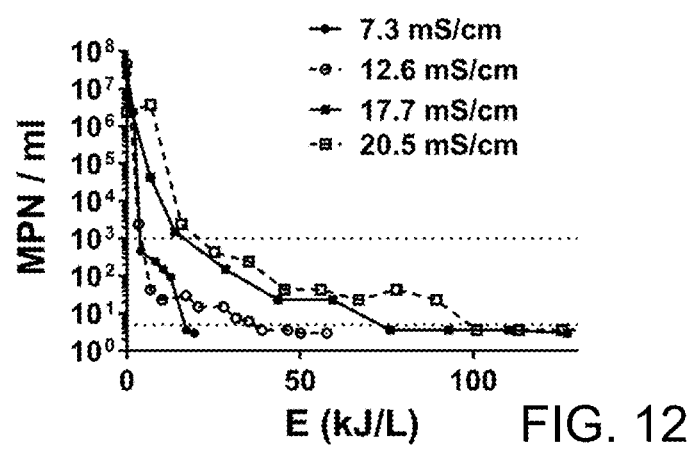
FIG. 12 is a plot of data regarding impact of solids accumulation on disinfection energy.
Figure 13:
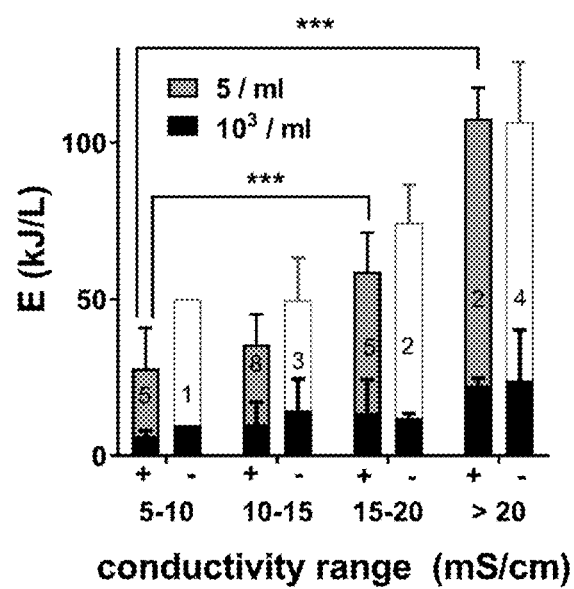
FIG. 13 is a plot of data regarding energy required for conductivity ranges.

Recycling blackwater increases energy required for electrochemical disinfection. Initial disinfection runs were performed at 24 V as previously described. As conductivity (and TS) of the process liquid increased with repeated recycling, the energy required to achieve the desired threshold of disinfection (5 MPN/ml) also increased significantly (FIG. 12). However, the energy required to achieve significant levels of microbial deactivation (below $10^3$ MPN/ml) changed very little with increasing conductivity; rather, the increase in total energy demand could be almost completely accounted for by an increase in the energy required to deactivate the last 2-3 log units (FIG. 13). Note that in some trials, the 5 MPN $mi^{-1}$ threshold was not reached at all, indicating the average disinfection energies from the positive trials likely underestimate the energy required for full disinfection.

FIG. 12 is a plot of data regarding impact of solids accumulation on disinfection energy. Representative kill curves showing MPN over the course of EC treatment versus EC energy at different process liquid conductivities. Dotted lines indicate disinfection thresholds (103 and 5 MPN/ml).

FIG. 13 is a plot of data regarding disinfection trials, all conducted at in constant voltage mode at 24 V, and segmented based on conductivity of the process liquid at the beginning of the trial. "+" indicates trials in which complete disinfection (MPN<5/ml) was achieved; "−" indicates trials where this threshold was not achieved. Bars indicate the mean energy (±S.D.) required to achieve the indicated MPN thresholds, with the number of trials per condition indicated by the numbers inside each stack of bars. The white bars in the "−" trials indicate the highest EC energy recorded without reaching the disinfection threshold in those trials. Total energies required to achieve complete disinfection in the "+" trials were compared by one-way ANOVA with a Dunnett's multiple comparison, test, ***=$p<0.001$ for the comparisons indicated.

Figure 14:
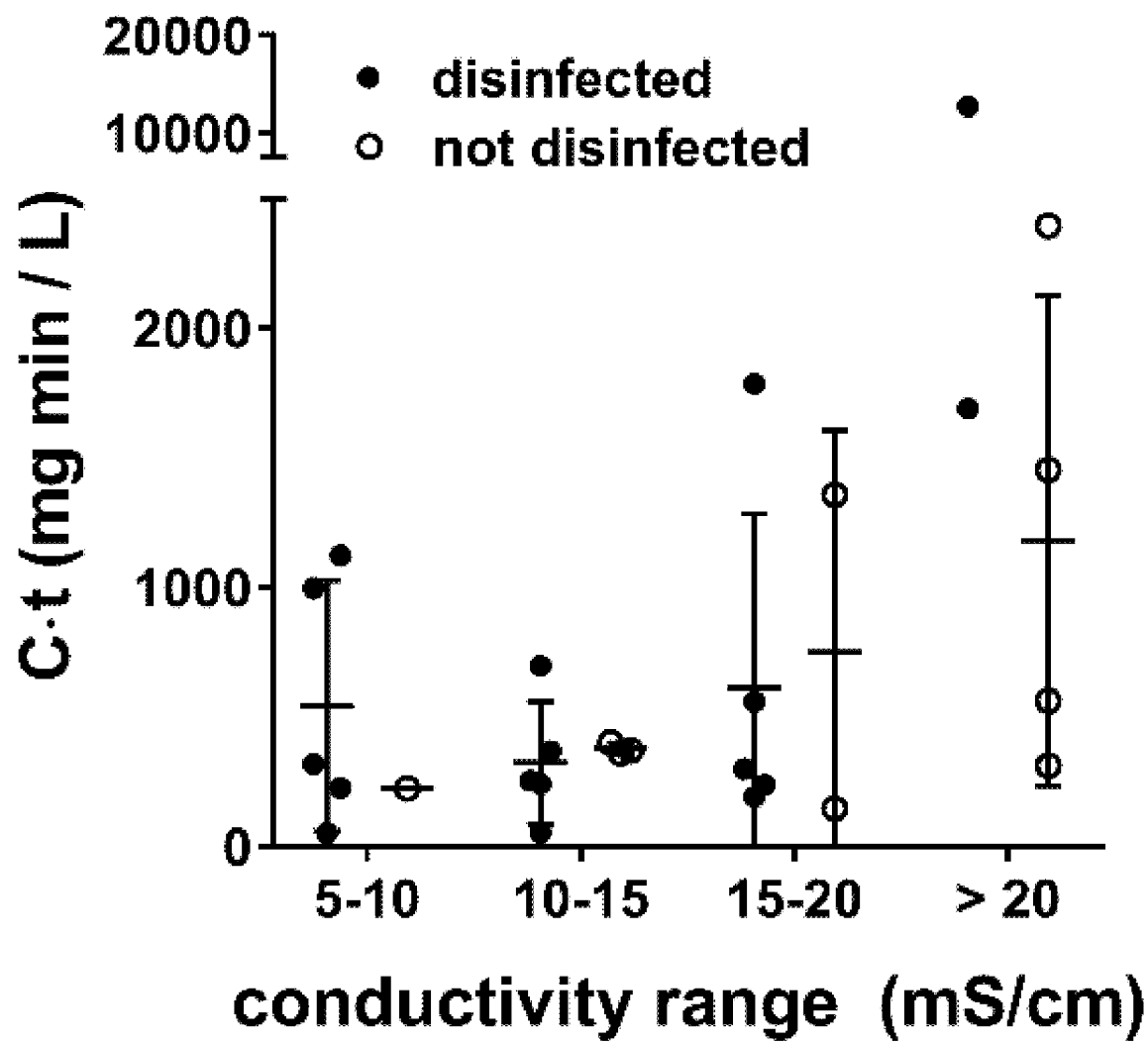
FIG. 14 is a plot of free chlorine contact time.

FIG. 14 is a plot of free chlorine contact time, which does not predict complete disinfection. Shown are estimated C·t values for free chlorine in trials across different conductivity ranges (same trials shown in FIG. 12) at complete disinfection (MPN<5/ml) or the highest value measured in trials where complete disinfection was not achieved.

The increase in energy required for full disinfection was accompanied by a trend towards increased C·t at the time of disinfection, but with considerable variability in C·t from trial to trial (FIG. 14). While most trials achieved complete disinfection at C·t<1000 mg·min/L, a number of trials either failed to achieve complete disinfection at comparable contact times or required significantly greater C·t (up to 13,000 mg·min/L) in order to achieve complete disinfection. Taken together, these data indicate that C·t is an unreliable parameter by which to predict complete disinfection of recycled blackwater, but also suggest that strategies to maximize C·t for a given electrochemical energy input may decrease the energy demand for disinfection.

Effects of varying voltage and on/off time—When the electrochemical cell was powered off, the average estimated half-life of free chlorine in our process liquid was 80 min (range 29-130 min) when MPN was >5/ml, and 167 min (range 122-188 min) when below the disinfection threshold, comparable to reported half-lives in treated water distribution systems; this is potentially long enough to increase contact times per energy used by operating the electrochemical cell in a pulsed on/off cycle rather than in continuous operation. To test this, low-voltage (24-V) and high-voltage (30-V) cycles were devised that pulsed on and off at 30 minute intervals after a free chlorine concentration >2 mg/L was achieved, which, for 30-L batches, was after 90 and 30 minutes of run time, respectively. The pulsed conditions were compared with continuous operation at the same voltages, in process liquid at steady state (FIG. 11), defined as having a conductivity >20 mS/cm.

Summary of different operation cycles under steady state conditions (FIGS. 15A-17D)-FIGS. 15A-15D compare 24 V (open circles, dotted lines) and 24 V red (closed circles, solid lines) cycles, data from 6 and 4 independent runs, respectively. FIGS. 16A-16D compare 30 V (open circles, dotted lines) and 30 V red (closed circles, solid lines), data from 2 and 3 independent runs, respectively. FIGS. 17A-17D compare data from 6 independent runs with a 24 V+32 V cycle. Results from continuous and reduced operation cycles were compared by two-way ANOVA with a Sidak's multiple comparison test. *=$p<0.05$, ***=$p<0.001$. Panels are mean±S.D.

In the 24-V trials (FIGS. 15A-15D), pulsed operation was associated with decreased electrochemical energy for a given run time, as expected. When all disinfection runs were taken into account, there was no difference in free chlorine measured over time between the pulsed and continuous operating conditions, nor in the C·t.

In the 30-V runs (FIGS. 16A-16D) the difference in electrochemical energy was larger between pulsed and continuous conditions, and the free chlorine and C·t were significantly higher in the continuous condition at run times >90 and >150 minutes, respectively. However, at both voltages, pulsed operation led to a slightly, but consistently higher energy requirement to achieve the same C·t than continuous operation (see FIGS. 20-21).

Figure 18:
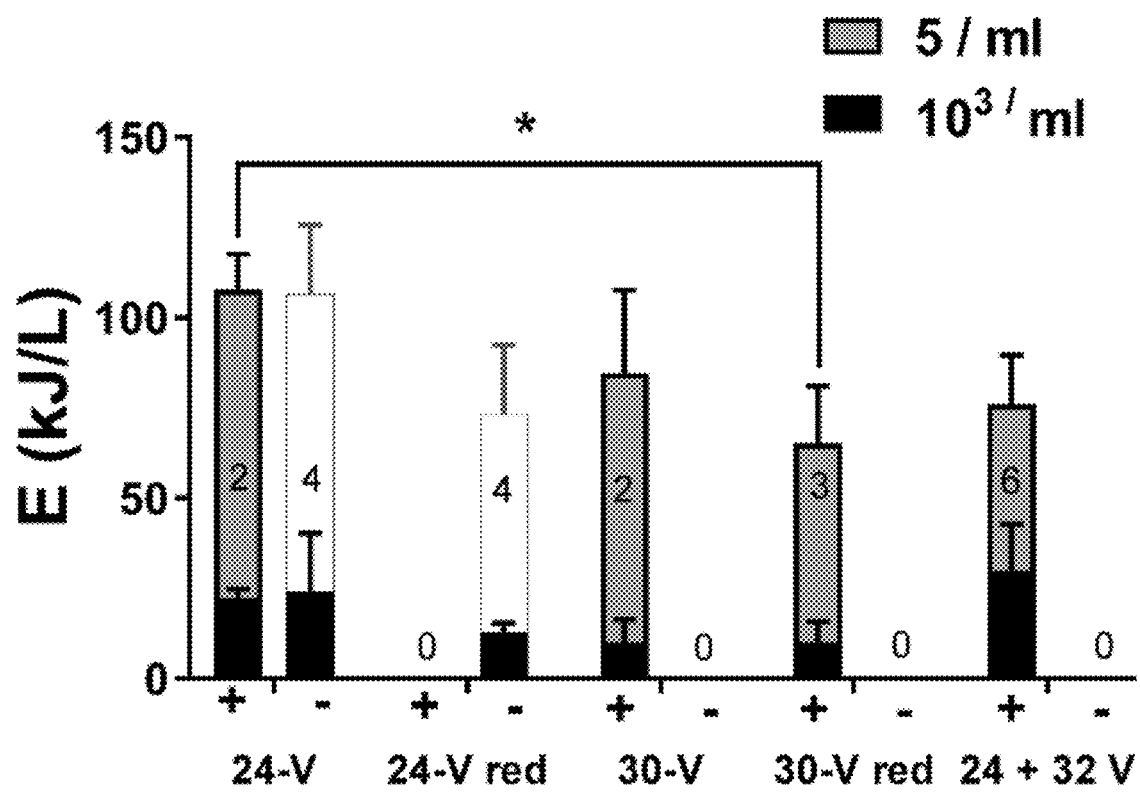
FIG. 18 is a plot of Efficacy and energy efficiency of several operation cycles.

Evaluation of the disinfection efficacy and energy efficiency of these different cycles is presented in FIG. 18. Complete disinfection was not achieved in any of the 24-V reduced cycle (24-V red) runs (longest run time was 600 min). However, both the 30-V and 30-V red cycles consistently achieved complete disinfection and with slightly improved energy efficiency over the 24-V condition. Interestingly, the energy required to meet disinfection thresholds in all conditions was independent of starting MPN (see FIGS. 22-23).

While energy optimization is a high priority for the development of this technology, another priority is the ability to establish operating parameters that are easily programmed (such as run time), that do not require real-time feedback from the system or operator intervention, and will reliably disinfect the process liquid every time. Though the disinfection thresholds were consistently achieved within a narrow range of electrochemical energy expenditures for each operating cycle tested, variability in the conductivity and current across individual runs meant that actual run times varied widely (for example, 30-V disinfection times ranged from 105 to 240 min, see FIGS. 24-28) and required continuous user monitoring to determine how long the disinfection run needed to be performed.

With the goal of establishing run times and voltages that will meet the criteria necessary for independent/automated operation, an additional operational cycle was tested consisting of a 24-V phase for 60 min followed by a 32-V phase for 90 min (FIGS. 17A-17D). This cycle was chosen based on the observations that: (1) 24 V was sufficient for deactivation of microbes down to 103/ml (FIG. 13) and with comparatively low free chlorine levels (FIG. 15C); (2) raising the voltage reduced overall run time required to achieve complete disinfection, and (3) at steady state process liquid conditions, higher voltage more consistently achieved complete disinfection (FIG. 18). Thus, the combined voltage cycle represented a compromise between the goals of maximizing energy efficiency and establishing reliably efficacious run times. Across six trials, this operational cycle achieved the threshold for complete disinfection every time, with energy efficiency matching the 30-V runs (FIG. 18), but with a shorter and more predictable run time (<150 min total for all runs, FIGS. 24-28) than any other cycle tested.

With the 24+32 V operating cycle (FIGS. 17A-17D), the average energy expenditure for the electrochemical process to achieve complete disinfection was 76 kJ/L (21 Wh/L.) On a per volume basis, this is approximately ten times the energy requirement recently reported (2 Wh/L) for a similar electrochemical process to achieve a 5-log reduction in model bacteria added to dilute toilet waste water. The described system has been tested exclusively with concentrated blackwater representing anticipated field conditions (including a diverse population of microorgansims), with starting microbial counts typically on the order of $10^7$ ml$^{-1}$, and with an absolute (rather than relative reduction) threshold for complete disinfection, which is essential for recycling. Given the "long tail" shape of our disinfection curves (e.g., FIG. 12) which indicate that the majority of the electrochemical energy is spent on deactivating the last 1-2 log units, we postulate that the disparity in energy efficiencies between the systems can be accounted for by the different test media and evaluation criteria.

FIG. 18 is a plot of Efficacy and energy efficiency of several operation cycles. Disinfection trials conducted on "steady state" effluent (conductivity>20 mS/cm) with different voltages operation cycles are shown. In FIG. 18: "+" indicates trials in which complete disinfection (MPN<5 ml-1) was achieved; and "−" indicates trials where this threshold was not achieved. Bars indicate the mean energy (±S.D.) required to achieve the indicated MPN thresholds, with the number of trials per condition indicated by the numbers inside each stack of bars. The white bars in the "−" trials indicate the highest EC energy recorded without reaching the disinfection threshold in those trials. Note that the data shown for 24 V are the same as presented for ">20 mS/cm" in FIG. 13, included here for reference. Total energies required to achieve complete disinfection in the "+" trials were compared by one-way ANOVA with a Dunnett's multiple comparison, test. *=p<0.05 for the comparison indicated.

Figure 21:
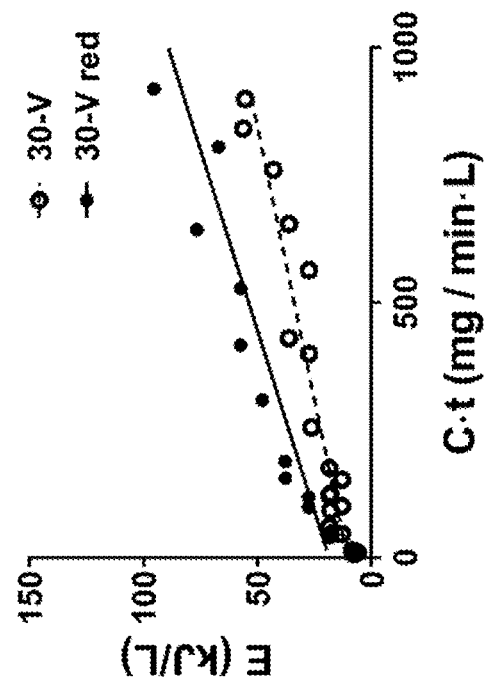
FIG. 21 is a plot of electrochemical energy expended to achieve a given C·t at 30V.
Figure 20:
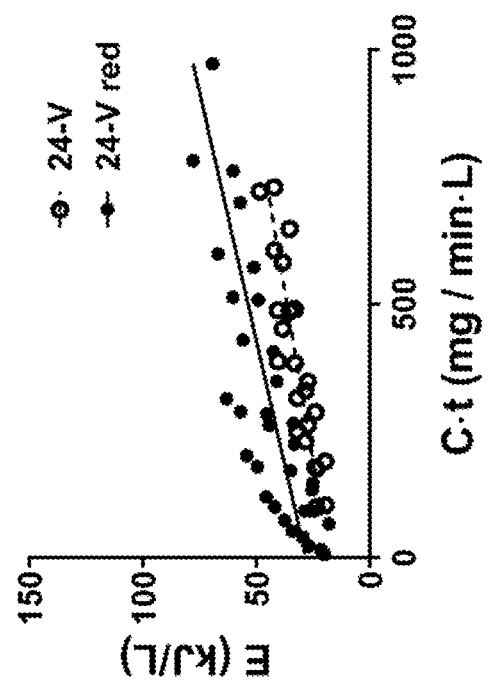
FIG. 20 is a plot of electrochemical energy expended to achieve a given C·t at 24 V.

FIG. 20 is a plot of electrochemical energy expended to achieve a given C·t at 24 V. FIG. 21 is a plot of electrochemical energy expended to achieve a given C·t at 30V. Data are the individual points summarized as mean±S.D. in FIGS. 15B and 16B, presented here as scatter plots. Lines indicate the linear regressions of each data set.

Figure 23:
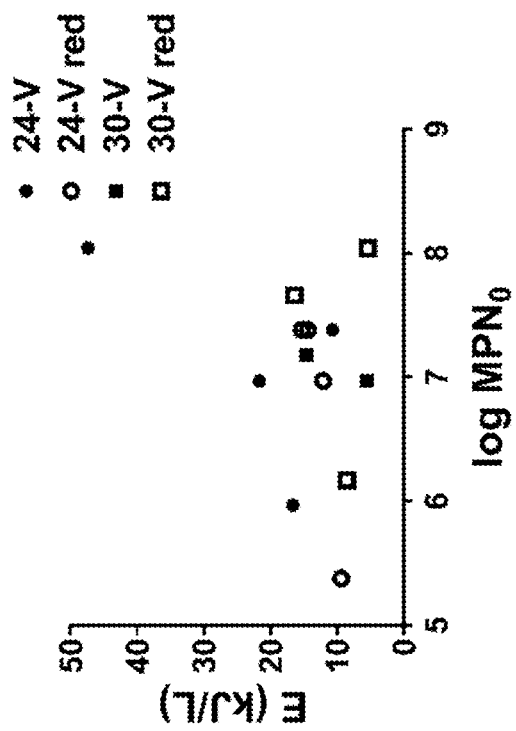
FIG. 23 is plot of energy required to reduce MPN to $10^3$ $ml^{-1}$.
Figure 22:
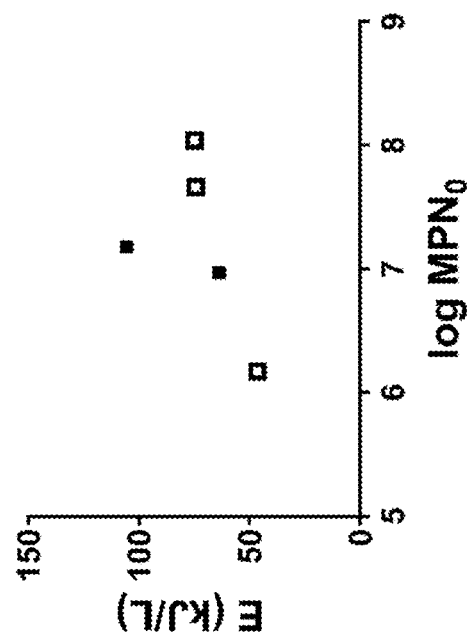
FIG. 22 is a plot of energy required to reduce MPN to 5 $ml^{-1}$.
Figure 24:
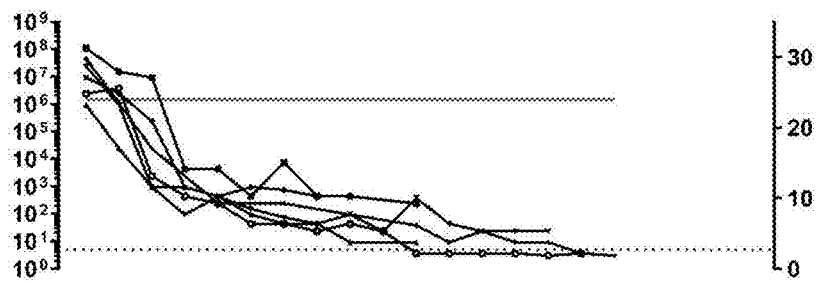
FIG. 24 shows plots of kill curves with respect to run time for a voltage schedule as shown.
Figure 25:
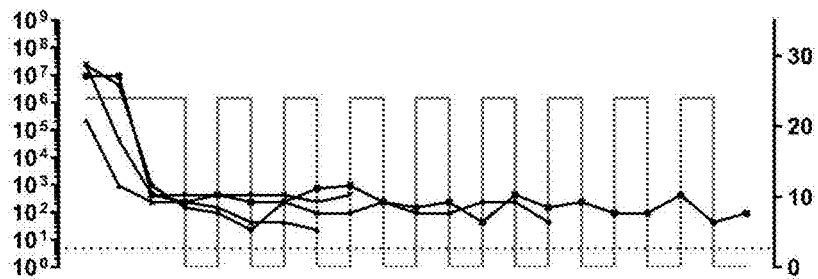
FIG. 25 shows plots of kill curves with respect to run time for a voltage schedule as shown.
Figure 26:
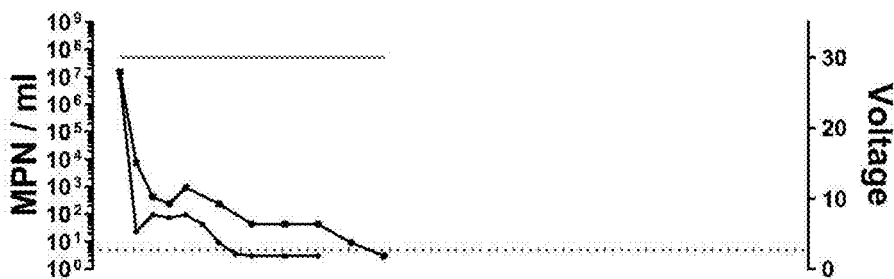
FIG. 26 shows plots of kill curves with respect to run time for a voltage schedule as shown.
Figure 27:
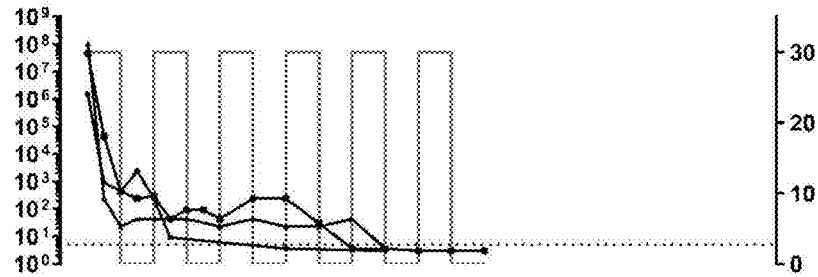
FIG. 27 shows plots of kill curves with respect to run time for a voltage schedule as shown.
Figure 28:
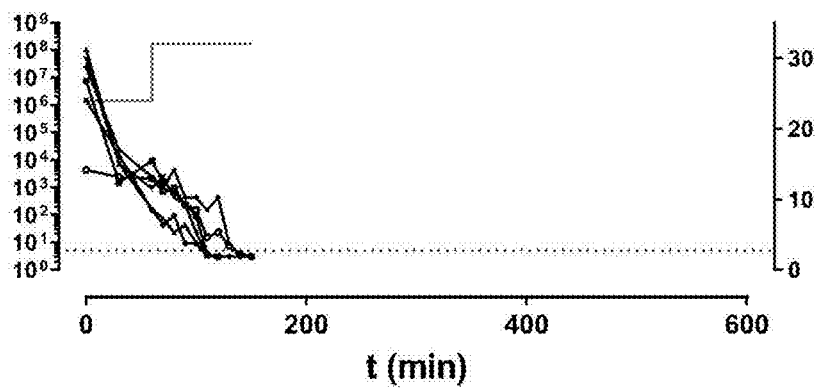
FIG. 28 shows plots of kill curves with respect to run time for a voltage schedule as shown.

FIG. 22 is a plot of energy required to reduce MPN to 5 ml$^{-1}$, which is not dependent on initial MPN (MPN$_0$). FIG. 23 is plot of energy required to reduce MPN to $10^3$ ml$^{-1}$, which is not dependent on initial MPN (MPN$_0$). Data are from the individual disinfection trials shown in FIGS. 15A-17D and FIG. 18.

FIGS. 24-28 are plots of kill curves with respect to run time for all runs summarized in 15A-17D and FIG. 18. MPN are in black (left axis), operating voltages are in grey (right axis). Dotted line=threshold for complete disinfection (MPN 5/ml).

Characteristics of recycled blackwater drive its comparatively high disinfection energy demand and the long tail phenomenon, including chemical oxygen demand and association of microorganisms with particles.

Conclusion—Repeated recycling of disinfected blackwater in a free-standing waste water treatment application leads to accumulation of solids and electrolytes in the process liquid, which rapidly achieve a steady state.

Accumulation of solids is associated with significantly increased energy requirement to achieve complete disinfection with an electrochemical process. Thus, a clear definition of steady state is useful to making meaningful comparisons of different operating parameters in this system.

Raising the operating voltage to 30 or 32 V modestly decreased the energy required for complete disinfection of steady state effluent compared to 24 V; a two-stage process with a 24-V phase followed by a 32-V phase matched this efficiency with a more reliable run time.

Particular embodiments and features have been described with reference to the drawings. It is to be understood that these descriptions are not limited to any single embodiment or any particular set of features, and that similar embodiments and features may arise or modifications and additions may be made without departing from the scope of these descriptions and the spirit of the appended claims.

What is claimed is:

1. A liquid waste treatment system comprising:
   a baffle tank subsystem for particle settling;
   a preprocess tank subsystem downstream of the baffle tank subsystem;
   a process tank subsystem downstream of the preprocess tank subsystem;
   a storage tank subsystem downstream of the process tank subsystem for the storage of treated liquid; and
   a Microbial Fuel Cell (MFC) processing module, wherein the MFC processing module reduces a chemical oxygen demand (COD) of liquid waste.

2. The liquid waste treatment system of claim 1, further comprising a solid-liquid separator, wherein:
   the baffle tank subsystem reduces solid material from liquid waste; and
   the baffle tank subsystem is downstream of the solid-liquid separator.

3. The liquid waste treatment system of claim 1, wherein the process tank subsystem implements at least one of electrochemical treatment, packed bed electrochemical treatment, thermal treatment, and ultraviolet treatment.

4. The liquid waste treatment system of claim 1, further comprising conduits that connect said subsystems in a downstream flow arrangement from the baffle tank subsystem to the storage tank subsystem; wherein at least one of said conduits includes a valve to permit liquid waste under treatment to flow downstream.

5. The liquid waste treatment system of claim 1, further comprising a pass-through disinfection path parallel to the process tank subsystem from the preprocess tank subsystem to the storage tank subsystem, wherein the pass-through disinfection path comprises at least one of: an electrochemical cell; a filter; a membrane; a heat exchanger; and an ultraviolet radiation device.

6. The liquid waste treatment system of claim 1, further comprising a polishing filter subsystem downstream of the storage tank subsystem, wherein the polishing filter subsystem further treats liquid to potable standards.

7. The liquid waste treatment system of claim 6, wherein the polishing filter subsystem implements forward or reverse osmosis filtration, or distillation.

8. The liquid waste treatment system of claim 1, wherein the MFC processing module is inserted into the preprocess tank subsystem.

9. The liquid waste treatment system of claim 1, further comprising a second process tank downstream of the process tank subsystem, wherein:
the MFC processing module is implemented in the second process tank;
a first disinfection occurs in the process tank subsystem;
a second disinfection occurs in the second process tank, and
the first disinfection is faster than the second disinfection.

10. The liquid waste treatment system of claim 1, further comprising a platform upon which the baffle tank subsystem, the preprocess tank subsystem, the process tank subsystem, and the storage tank subsystem are carried, wherein stacking of at least one of the preprocess tank subsystem, the process tank subsystem, and the storage tank subsystem above a solid waste handling subsystem reduces a footprint of the liquid waste treatment system.

11. The liquid waste treatment system of claim 1, further comprising an electrochemical cell operated in a pulsed mode.

12. The liquid waste treatment system of claim 11, wherein the electrochemical cell is operated in the pulsed mode after a concentration of a chemical in a process liquid under treatment in the liquid waste treatment system reaches a predetermined threshold.

13. The liquid waste treatment system of claim 12, wherein the chemical comprises chlorine.

14. The liquid waste treatment system of claim 11, wherein the electrochemical cell is positioned in the process tank subsystem.

15. A method of liquid waste treatment comprising:
providing liquid waste to a baffle tank subsystem for particle settling;
providing the liquid waste from the baffle tank subsystem to a preprocess tank subsystem downstream of the baffle tank subsystem;
providing the liquid waste from the preprocess tank subsystem to a process tank subsystem downstream of the preprocess tank subsystem; and
providing the liquid waste from the process tank subsystem to a storage tank subsystem downstream of the process tank subsystem for the storage of treated liquid; and
reducing a chemical oxygen demand (COD) of liquid waste using a Microbial Fuel Cell (MFC) processing module.

16. The method of claim 15, further comprising providing an electrochemical cell, and operating the electrochemical cell in the liquid waste in a pulsed mode.

17. The method of claim 16, wherein the electrochemical cell is operated in the pulsed mode after a concentration of a chemical in the liquid waste reaches a predetermined threshold.

18. The method of claim 17, wherein the chemical comprises chlorine.

19. The method of claim 16, wherein the electrochemical cell is positioned in the process tank subsystem.

20. A liquid waste treatment system comprising:
a baffle tank subsystem for particle settling;
a preprocess tank subsystem downstream of the baffle tank subsystem;
a process tank subsystem downstream of the preprocess tank subsystem;
a storage tank subsystem downstream of the process tank subsystem for the storage of treated liquid; and
a platform upon which the baffle tank subsystem, the preprocess tank subsystem, the process tank subsystem, and the storage tank subsystem are carried, wherein stacking of at least one of the preprocess tank subsystem, the process tank subsystem, and the storage tank subsystem above a solid waste handling subsystem reduces a footprint of the liquid waste treatment system.

* * * * *